United States Patent [19]
Beardsley et al.

[11] Patent Number: 6,105,076
[45] Date of Patent: Aug. 15, 2000

[54] METHOD, SYSTEM, AND PROGRAM FOR PERFORMING DATA TRANSFER OPERATIONS ON USER DATA

[75] Inventors: Brent Cameron Beardsley, Tucson, Ariz.; Michael Aloysius Paulsen, deceased, late of Morgan Hill, Calif., by Lorrilyn R. Paulsen, legal representative

[73] Assignee: International Business Machines Corporation, Armonk, N.Y.

[21] Appl. No.: 09/298,154

[22] Filed: Apr. 23, 1999

[51] Int. Cl.[7] .................................................. G06F 13/00
[52] U.S. Cl. .............................................. 710/5; 711/137
[58] Field of Search ........................... 710/1, 5–6, 22–28; 711/4, 111–114, 113–137; 360/484

[56] References Cited

U.S. PATENT DOCUMENTS

| | | | |
|---|---|---|---|
| 4,262,332 | 4/1981 | Bass et al. | 711/114 |
| 4,630,030 | 12/1986 | Roy | 341/95 |
| 4,849,878 | 7/1989 | Roy | 707/200 |
| 4,935,869 | 6/1990 | Yamamoto | 707/202 |
| 5,157,770 | 10/1992 | Beardsley et al. | 711/112 |
| 5,237,661 | 8/1993 | Kawamura et al. | 710/52 |
| 5,388,219 | 2/1995 | Chan et al. | 710/5 |
| 5,442,802 | 8/1995 | Brent et al. | 709/100 |
| 5,459,838 | 10/1995 | Coscarella et al. | 710/7 |
| 5,539,918 | 7/1996 | Allen et al. | 710/33 |
| 5,592,342 | 1/1997 | Hall et al. | 360/48 |
| 5,634,031 | 5/1997 | Sakuma | 711/111 |
| 5,742,792 | 4/1998 | Yanai et al. | 711/162 |
| 6,009,498 | 12/1999 | Kumasawa et asl. | 711/113 |
| 6,041,386 | 3/2000 | Bello | 711/4 |

OTHER PUBLICATIONS

ANSI, "Information Technology—Small Computer System Interface—2", reference No. X3.131–199X, revision 10L, Sep. 7, 1993, pp. 178–182.

IBM"IBM 3990 Storage Control Reference", Dec. 8, 1994, Chap. 4, Doc. No. GA32–0099–06.

IBM "Escon I/O Interface", Sep. 8, 1992, Chap. 7, Doc. No. SA22–7202–02.

IBM Technical Disclosure Bulletin, vol. 38 No. 6, "Methods of Prefetching Without Using a Separate Instruction", Jun. 1995.

*Primary Examiner*—Christopher B. Shin
*Attorney, Agent, or Firm*—David W. Victor; Konrad Raynes & Victor LLP

[57] ABSTRACT

In summary, preferred embodiments disclose a system, method, and program for data transfer commands to perform data transfer operations between a first processing unit and second processing unit. The second processing unit controls access to a storage system. The storage system storage space is logically divided into multiple tracks. Each track includes one or more data records. Each data record includes an index area providing index information on the content of the data record and a user data area including user data. An initialization command is communicated from the first processing unit to the second processing unit indicating a range of tracks on which data transfer operations will be performed. For each track in the range of tracks, a set of data transfer operations is executed. This set of data transfer operations includes transmitting a data transfer command from the first processing unit to the second processing unit. The data transfer command causes the second processing unit to perform data transfer operations with respect to user data areas in multiple data records on an accessed track in the range of tracks. The data transferred during the data transfer operation is free of data from the index areas of the data records.

40 Claims, 6 Drawing Sheets

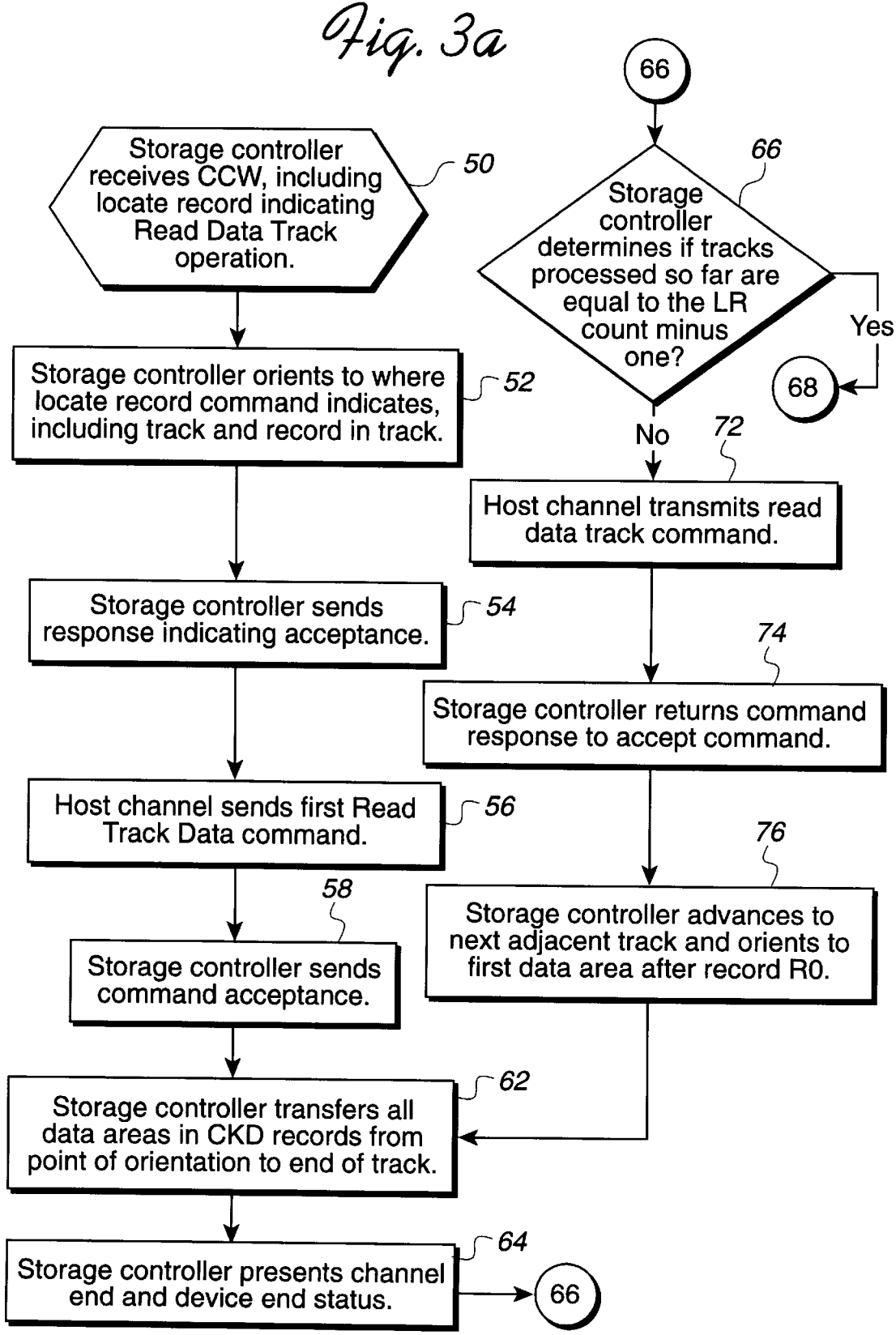

METHOD, SYSTEM, AND PROGRAM FOR PERFORMING DATA TRANSFER OPERATIONS ON USER DATA

BACKGROUND OF THE INVENTION

1. Field of the Invention

The present invention relates to a method, system, and program for performing data operations and, in particular, for performing data transfer operations with respect to user data areas of data records that also include index information.

2. Description of the Related Art

With the Small Computer System Interface (SCSI), a read command can transfer a specified number of blocks from a starting block. A SCSI read command, such as the READ (10) command specifies a starting logical block address and a transfer length indicating the number of blocks to transfer from the starting logical block address. Similarly, the SCSI PRE-FETCH command can cause a specified number of blocks, indicated in the transfer length field, from a specified starting logical block address to be retrieved from storage and placed in cache for subsequent transfer to the requesting application. The SCSI commands are described in the publication "Information Technology-Small Computer System Interface-2," published by ANSI on Apr. 19, 1996, reference no. X3.131-199x, Revision 10L, which publication is incorporated herein by reference in its entirety.

In operating systems that conform to the International Business Machines Corporation ("IBM") Enterprise Systems Architecture (ESA) 360, 370, and 390 architectures, data transfer operations are performed using channel command words (CCW) which are transferred from a host computer system to a storage controller. Enterprise System Architecture/390 is a registered trademark of IBM. The storage controller, also referred to as a control unit or storage director, manages access to a storage space comprised of numerous hard disk drives connected in a loop architecture, otherwise referred to as a Direct Access Storage Device (DASD). In such systems, data may be stored in a Count-Key-Data ("CKD") data format. A count field provides the name and format of a record, the key length, and the data length. The key field, which is optional, is used for searching and may indicate the last data set in the record. The data field provides a variable length record of user data sets. The number of CKD records that can be placed on a track depends on the length of the data areas of the records.

FIG. 1 illustrates a CCW command sequence to transfer data. The first sequence of commands in the chain is a Define Extent command sequence which defines the extent or range of tracks in which a channel program will operate. The host system executes channel programs to perform data transfer operations. An extent is a set of consecutively addressed tracks that the channel program can access. The limits of an extent are defined by specifying the addresses of the first and last tracks in the extent. The Define Extent command sequence further defines attributes of, and limitations on, the commands that follow in the channel program. Following the Define Extent command sequence is a Locate Record command sequence that specifies the operations, the number of consecutive records (or tracks) involved in the data operation, and the address of the first track and the orientation state to establish before starting data transfer. One or more read or write command sequences may follow the Locate Record command sequence to perform data transfer operations. A read command sequence to allow the host to read data from the storage controller, labeled as number 2 in FIG. 1, involves the transfer of several separate commands between the host and the storage controller. The storage controller will perform the requested operation on the CKD records and present status information to the host indicating whether the operation failed or successfully completed.

Sequential data access occurs when numerous adjacent tracks are accessed, such as for a data backup operation, batch operations or to generate a large report. Generally, sequential data operations consume significantly more overhead, such as bus bandwidth, than random or nonsequential data operations, as a sequential operation typically involves a longer chain of data. To perform a sequential read or write operation to read or write a sequential number of data records, the CCW command must include a separate read command to read the user data from each CKD record on the track. A sequential operation involves reading or writing the user data areas on numerous consecutive tracks. A track includes multiple CKD records. Thus, to perform a sequential read or write operation with respect to user data, the host must send a separate read or write command for every CKD record including user data in every track. Further, when using an Enterprise System Connection Interface (ESCON®), further set-up commands may be involved in data transfer operations, thus further increasing network operations for sequential data transfers. ESCON is a registered trademark of IBM corporation. FIG. 1 illustrates the commands that must be performed to perform a read operation to retrieve multiple records, such as the case in a sequential read operation. As can be seen from FIG. 1 there are numerous set-up operations performed before the data is actually transferred. Further, multiple commands, labeled as number 2 in FIG. 1, are sent between the host and storage controller to read the user data sets in a CKD record. Thus, there is a separate instance of the read command sequence labeled number 2 for each user data area in a CKD record to read from the track.

As shown in the command sequence labeled number 2, to read user data from a CKD record in a track, the host must transfer the read command, the storage controller must return a frame indicating command acceptance, the storage controller then returns the requested data and, at the completion of returning the data, returns completion status. In the case of a sequential access involving numerous records, the host continues sending separate read command sequences, labeled number 2, to read user data from each CKD record on all the tracks involved until all user data is read. A write operation is similar, except that after the storage controller indicates acceptance of the write command, the host transmits the data record for a CKD record to the storage controller. Data transfer operations involving CKD records are further described in the IBM publications: "Enterprise Systems Architecture/390: ESCON I/O Interface," IBM document no. SA22-7202-02 (Copyright IBM Corp., 1990, 1991, 1992) and "IBM 3990 Storage Control Reference (Models 1, 2, and 3)," IBM document no. GA32-0099-06 (Copyright IBM Corp., 1998, 1994), which publications are incorporated herein by reference in their entirety.

Two commands, the Read Multiple Count Key Data (RMCKD) and Read Full Track (RFT), allow the transfer of multiple data records. RMCKD transfers the count, key, and data areas from multiple CKD records from a starting point to the end of a track. RFT transfers all the count, key and data areas on a track. Both these commands are utilized for dump/restore operations, such as when the entire track contents needs to be dumped to a storage area in the event of a system failure. The RFT and RMCKD commands are not useful for sequential data transfer operations because they transfer the count and key data along with the user data. Currently, for sequential data operations, only a series of multiple read operations is available to read user data area from each CKD record in a range of records to be sequentially accessed.

As can be seen, data transfer operations across multiple data records, such as is the case with sequential data transfers in the ESA 360, 370, and 390 type architectures, require the transmission of numerous commands which increases channel traffic and consequently reduces bandwidth. Accordingly, there is a need to improve the efficiency of data transfer operations.

SUMMARY OF THE PREFERRED EMBODIMENTS

To overcome the limitations in the prior art described above, preferred embodiments disclose a system, method, and program for executing data transfer commands to perform data transfer operations between a first processing unit and second processing unit. The second processing unit controls access to a storage system. The storage system storage space is logically divided into multiple tracks. Each track includes one or more data records. Each data record includes an index area providing index information on the content of the data record and a user data area including user data. An initialization command is communicated from the first processing unit to the second processing unit indicating a range of tracks on which data transfer operations will be performed. For each track in the range of tracks, a set of data transfer operations is executed. This set of data transfer operations includes transmitting a data transfer command from the first processing unit to the second processing unit. The data transfer command causes the second processing unit to perform data transfer operations with respect to user data areas in multiple data records on an accessed track in the range of tracks. The data transferred during the data transfer operation is free of data from the index areas of the data records.

Preferred embodiments may be implemented as program code within the first processing unit and second processing unit separately to allow communication of the data transfer command there between.

In further embodiments, the data records on the tracks are in the count-key-data format. In such case, the index area comprises the count and key data of the CKD data record.

In yet further embodiments, the data transfer operation is a read command. During execution of the read command, the second processing unit transfers data to the first processing unit that the second processing accessed from the storage system. The transferred data is free of data from the index areas.

In still further embodiments, the data transfer command is a write command. During execution of the write command, the second processing unit requests data from the first processing unit. The first processing unit transmits the user data to the second processing unit, which then writes the user data to the user data areas of the data records in the tracks.

Preferred embodiments provide new data transfer commands to allow the transfer of data areas from multiple data records, such as CKD records, on a track using a single command sequence. Thus, a single write or read command in accordance with preferred embodiments will cause the transfer of all user data areas from data records (CKD records) on a track. Such commands reduce command and channel traffic over current methods which require a separate command sequence to transfer user data for each data record (CKD record) on a track.

Preferred embodiments are particularly useful for sequential data operations in which user data from records on a track for multiple tracks are subject to data transfer operations. With the preferred embodiment commands, only a single command is used to transfer all the user data areas from a track, free of index data such as count and key information. Thus, the command sequence with the preferred embodiment commands requires only a single command per track involved in the sequential operation. This is an improvement over the current ESA 390 architecture which requires a separate command for each CKD record from which user data area will be transferred. Preferred embodiments, thus, substantially reduce channel traffic by substantially reducing the number of data transfer commands, and accompanying handshaking commands, needed to accomplish a sequential data transfer.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

System Architecture

Figure 1:
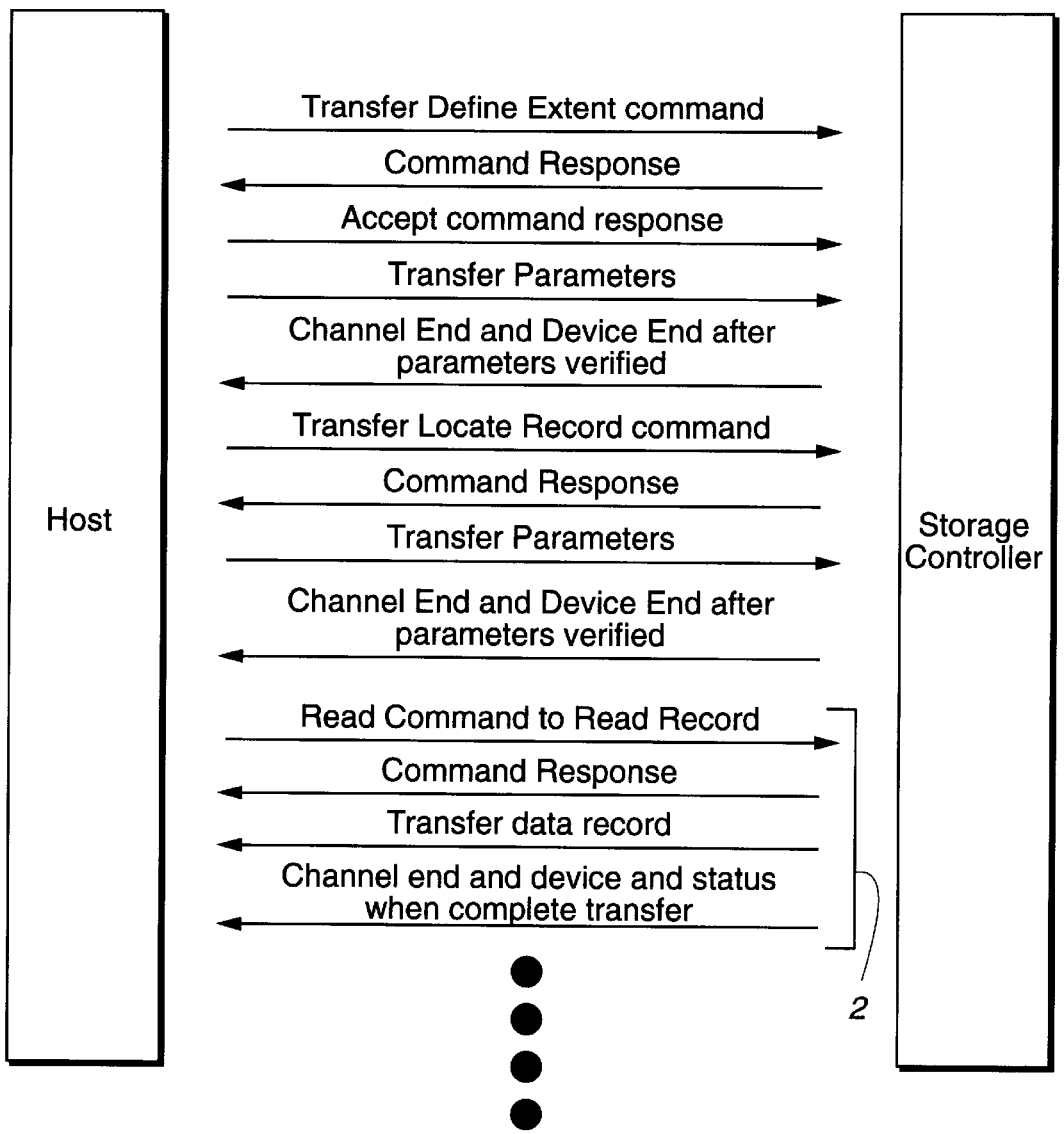
FIG. 1 illustrates a sequence of commands to perform a data transfer operations in a manner known in the art.
Figure 2:
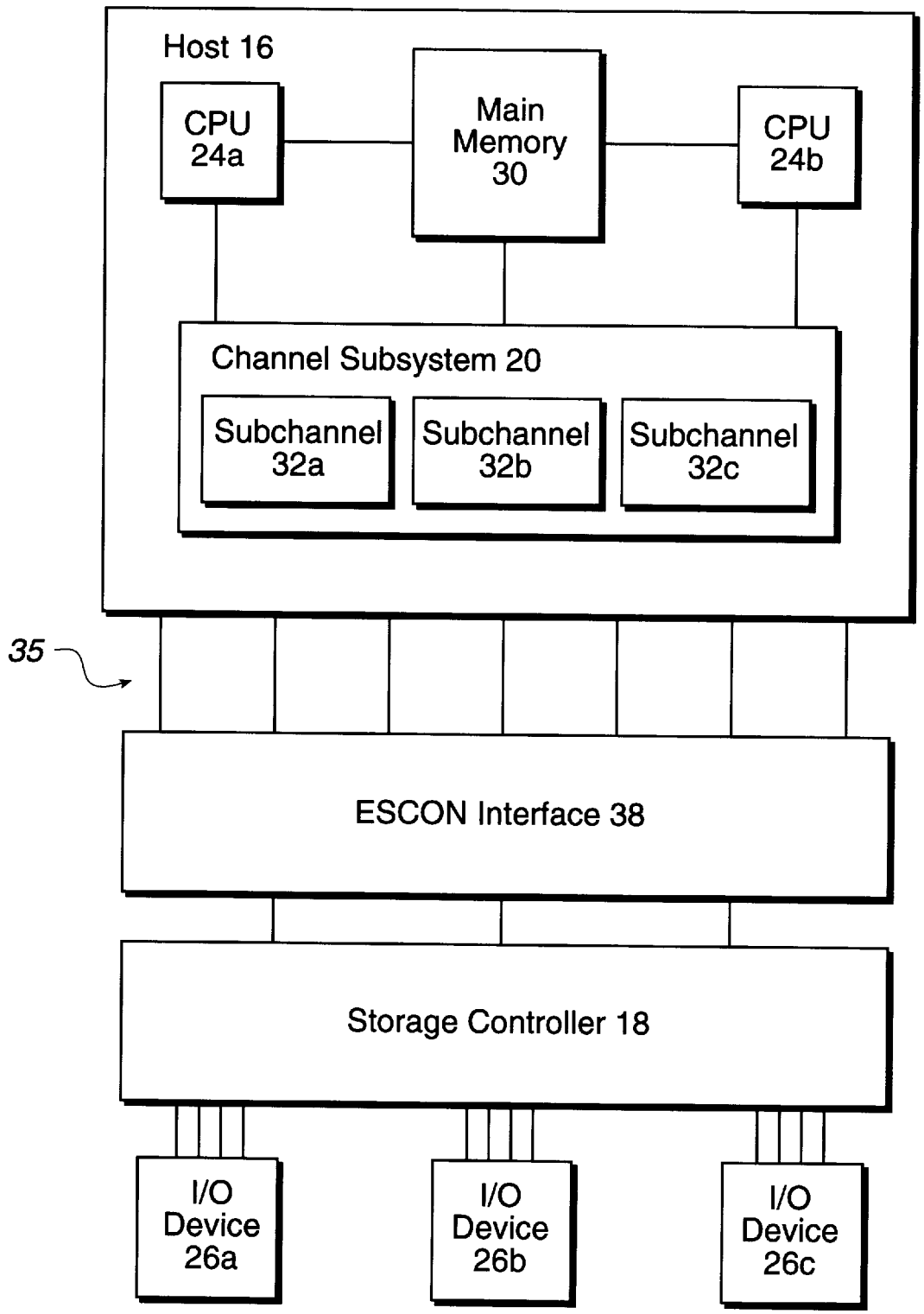
FIG. 2 is a block diagram illustrating a software and hardware environment in which preferred embodiments of the present invention are implemented.

FIG. 2 illustrates a preferred hardware and software architecture environment in which preferred embodiments are implemented. A host system 16 is in communication with a storage controller 18. The host system 16 views the storage controller 18 as a channel subsystem 20 that interfaces the CPUs 24a, b in the host 16 with I/O devices 26a, b, c. The host 16 may have more than the two CPUs 24a, b shown in FIG. 2. Moreover, in preferred embodiments the CPUs 24a, b are capable of multi-tasking and each CPU 24a, b can simultaneously issue parallel execution paths. The channel subsystem 20 is the host 16 view of paths to the I/O devices 26a, b, c as represented by subchannels 32a, b, c. The host 16 would execute channel commands to manage the operation of the I/O devices 26a, b, c. Each I/O device 26a, b, c may be a particular volume of a direct access storage device (DASD). The storage controller 18 controls access to the I/O devices 26a, b, c. The host system 16 may view the storage controller 18 as a multitude of separate control unit images or logical subsystems (LSSs), wherein each control unit image provides access to one or more I/O devices 26a, b, c. In alternative embodiments, there may actually be multiple storage controllers providing communication with different I/O devices 26a, b, c. The channel subsystem 20, which may be a construct maintained in the main memory 30 of the host 16, includes subchannels 32a, b, c that execute operations for the channel subsystem 20. Channel paths 35 provide data communication between the host 16 and storage controller 18. Further details of the channel subsystem and interaction with the storage controller 18 are described in the commonly assigned and co-pending patent applications: "Method And System For Dynamically Assigning Addresses To An Input/ Output Device," by Brent C. Beardsley, Allan S. Merritt, Michael A. Paulsen, and Harry M. Yudenfriend, filed on Oct. 7, 1998, and having U.S. patent Ser. No. 09/167,782; and "System For Accessing An Input/Output Device Using Multiple Addresses," by Brent C. Beardsley, James L. Iskiyan, James McIlvain, Phillip R. Mills, Michael A. Paulsen, William G. Thompson, Harry M. Yudenfriend, filed on Oct. 7, 1998, and having U.S. patent Ser. No. 09/168,017, which patent applications are incorporated herein by reference in their entirety.

Preferred embodiments, further include an ESCON interface 38 that provides the communication links between the channels 35 of the host 16 and the storage controller 18. The ESCON interface 38 may be a dynamic switch that provides a switched point-to-point configuration which connects each channel 35 to a port in the interface 38 to allow any one of the channels to form a link with a control unit image, which represents a LSS or I/O device 26a, b, c to the host 16. Sharing among the channels 35 and storage controller 38 through a dynamic switch means that communication with the storage controller 18 can take place over one link interface in the case where the storage controller 18 has only one link to the ESCON interface 38 dynamic switch or over multiple link interfaces in the case where the storage controller 18 has more than one link to the dynamic switch. Multiple connections from the storage controller 18 to the ESCON interface 38 allows multiple channels to communicate with different I/O devices 26a, b, c, or LSSs managed by the storage controller 18. In alternative embodiments, interface protocols and hardware interfaces other than the ESCON interface may be utilized as the interface 38.

The ESCON interface 38 establishes a link between a channel path 35 port and storage controller 18 port to provide two points of attachment, one at each end of the link. If a storage controller 18, or storage controller 18 image, attempts to send a message to a channel 35 already connected via another link with the storage controller 18 or in a dynamic path system where there are no available ports to connect a channel 35 with the storage controller 18, then the ESCON interface 38 returns a switch busy signal to the storage controller 18 requesting a link. Further details of how the ESCON interface 38 may link channel paths 35 and the storage controller 38 are described in the IBM publication "Enterprise Systems Architecture/390: ESCON I/O Interface," which publication was incorporated herein by reference above.

Data Transfer Operations

Preferred embodiments include additional read and write commands to utilize within a CCW command sequence to cause the transfer of multiple user data records with a single command. A Read Track Data command causes the transfer of the data areas in multiple records from a track to the host. Prior to transferring the Read Track Data command, the Locate Record command would be transferred from the host 16 to the storage controller 18 to indicate the Read Track Data operation and a range in which one or more Read Track Data operations will be performed. Each Read Track Data command in a CCW transfers all user data areas on the track to the host 16 channel 35.

A series of Read Track Data commands may be presented following a single Locate Record or Locate Record Extended command to cause the transfer of user data areas within CKD records from multiple tracks within the domain. The Locate Record Extended command may include a Read Trackset operation code and an Extended Parameter including a bit map that has a value for each sequential track in the domain of tracks on which data operations are to be performed. Values in the bit map may be set to "0" or "1." A "1" value indicates that the track corresponding to the bit map value is subject to the data transfer operation, whereas a bit map value of "0" indicates that the corresponding track is not subject to the data transfer operation. Thus, if the bit map parameter of the Locate Record Extended command defines multiple non-sequential tracks to read in a range of tracks, then the Read Track Data commands can transfer the user data areas from the CKD records in each of the tracks specified in the bit-map of the Locate Record Extended command. If the Read Track Data command is received outside of the domain of a Locate Record or Locate Record Extended command, execution is terminated with unit check status of an invalid command sequence.

Figure 3B:
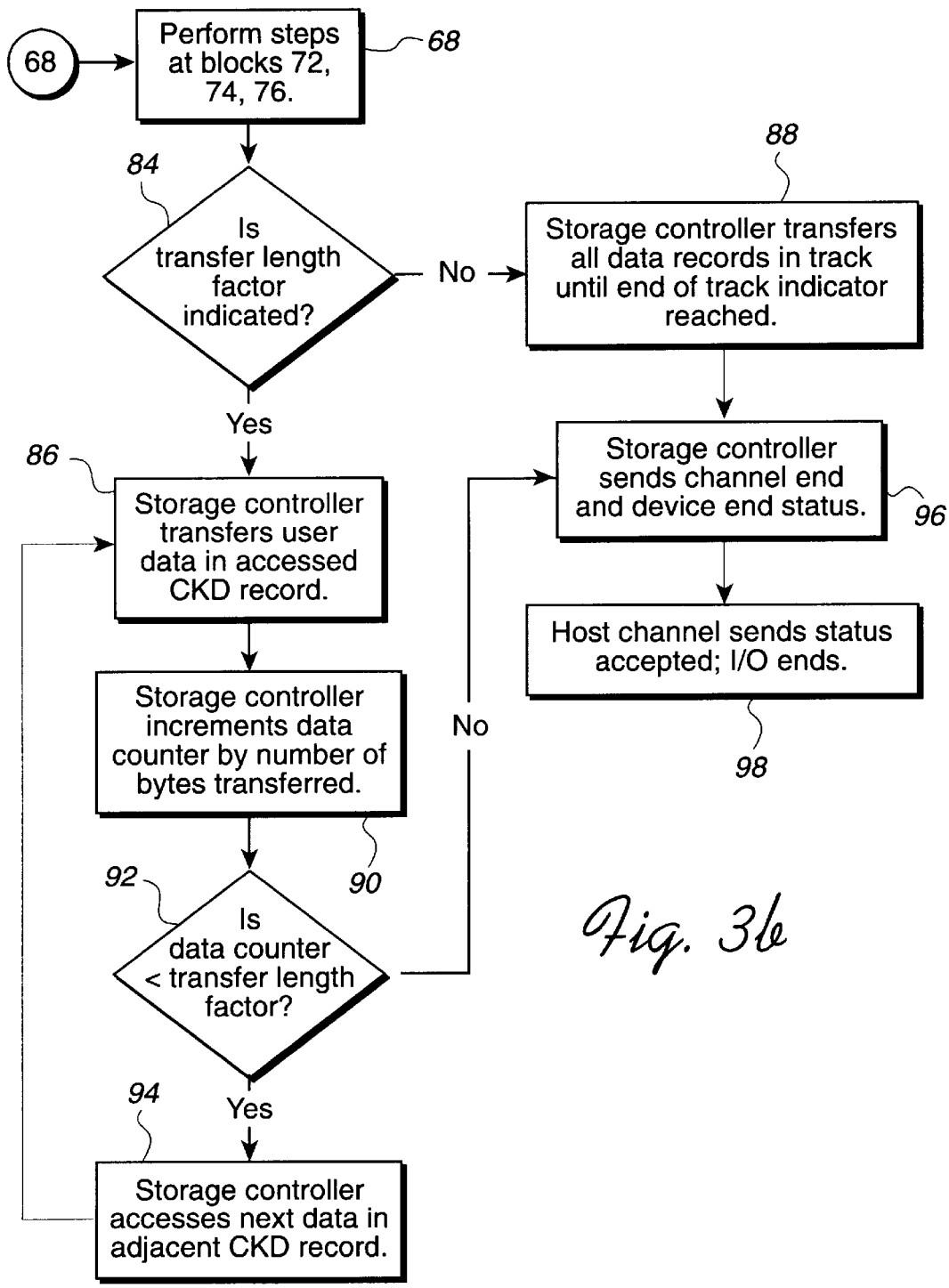
FIGS. 3a, b illustrate logic to execute a read operation in accordance with preferred embodiments of the present invention.

FIGS. 3a, b illustrate logic implemented in the host 16 and storage controller 18 operating systems to process a CCW command sequence including one or more Read Track Data commands within a domain defined by a Locate Record command. The operations shown in FIGS. 3a, b implemented in the host 16 and storage controller 18 may be executed asynchronously. Further, if an error is detected, then the execution may be terminated with a unit check status. FIGS. 3a, b illustrate a general flow of operations to perform a sequential read operation to transfer multiple data records across multiple tracks. Control begins at block 50 where the storage controller 18 receives a CCW chain, including a Define Extent and Locate Record commands to transfer sequential data records on sequential data tracks. In preferred embodiments, the Locate Record command would specify a Read Track operation code. This operation code is used to prepare the storage controller 18 for either a Read Track operation, which transfers all CKD records on the track, including the count and key data, as well as the Read Track Data operation of the preferred embodiments which causes the storage controller 18 to transfer all the user data areas in the CKD records for a track free of any count or key type data. The tracks to which the Read Track Data commands apply are specified in the extent range of the Define Extent command transferred before the Locate Record command. The Locate Record (LR) command further specifies a count value of the total number of tracks on which the Read Track Data command will operate and seek and search arguments to orient the storage controller to the first track at which the data transfer operations begin. The storage controller 18 orients (at block 52) to the track and data area within the track indicated in the Locate Record command Seek Address parameter. The Locate Record parameters may indicate any record, other than the first record $R_0$, as the starting record in the first track. If the storage controller 18 does not locate a user data area on the track following the first CKD record, then execution is terminated with unit check status indicating no record found.

The storage controller 18 then sends (at block 54) a response indicating acceptance of the Locate Record command. The host 16 channel 35 sends (at block 56) the first Read Track data command. In response, the storage controller 18 sends (at block 58) a command acceptance to the host 16 and then transfers (at block 62) the user data areas from the CKD records on the accessed track at the point of orientation to the end of the track. As discussed, in the first track of the operation, the starting position of the data transfer operation may be at any record in the track. After transferring all user data records on the track from the starting record, the storage controller 18 presents (at block 64) channel end and device end status. The storage controller 18 determines (at block 66) whether the cumulative number of tracks processed so far is less than the number of tracks indicated in the count field of the Locate Record command minus one, i.e., the current track is not the next to last track to be operated upon. The storage controller 18, as well as the host 16, may maintain a counter of the number of tracks for which data was transferred to compare against the total number of tracks to transfer indicated in the count field. If the number of tracks for which user data is transferred is not equal to the LR count minus one, then the host 16 (at block 72) transfers an additional Read Track Data command; otherwise, control transfers to block 68. The storage controller 18 would then return (at block 74) a command response accepting the Read Track Data command. The storage controller 18 advances (at block 76) to the next adjacent track and orients to the data area after the first CKD record, i.e., the $R_0$ record, and proceeds to transfer (at block 78) user data from each of the following CKD records in the current track until end of track status is reached. If there are no user data areas in this next track, then execution is terminated with unit check status for no record found. Further, if during any data transfer operation, the storage controller 18 accesses a defective track, then execution is terminated with unit check status indicating an invalid track pointer. In preferred embodiments, at the completion of transferring the user data areas from all CKD records on the track, the storage controller 18 is oriented to the data area of the last record transferred. The storage controller 18 would then proceed back to block 62 to transfer user data from the next track.

If, at block 66, the storage controller 18 is processing the last track to be processed, i.e., the number of tracks already processed equals the LR count minus one, then the storage controller 18 and host 16 perform (at block 68) the steps at blocks 72, 74, and 76, which results in the storage controller 18 advancing to the user data area in the second CKD record in the track following the $R_0$ record. The storage controller 18 then determines (at block 84) whether the Locate Record (LR) command includes a transfer length factor. The transfer length factor indicates a maximum number of bytes to transfer to the channel 35. If the transfer length factor is zero, then all user data areas in CKD records following the first CKD record on the last track are to be transferred. If the transfer length factor is non-zero, then the storage controller 18 transfers (at block 86) the user data in the current accessed CKD record. Otherwise, if there is no transfer length factor, the storage controller 18 transfers (at block 88) to the host 16 all user data records in the track until the end of track indicator is reached. After the storage controller 18 transfers the user data from the current accessed CKD record, in the case that there is a transfer length factor (from block 86), the storage controller 18 increments (at block 90) a data counter by the number of bytes transferred at block 86. The storage controller 18 then determines (at block 92) whether the data counter is less than the transfer length factor. If so, then the storage controller accesses (at block 94) the next data area in the next adjacent CKD record and proceeds back to block 86 to transfer the user data in the current accessed CKD record. Otherwise, if data bytes exceeding the transfer length factor have already been transferred, then the storage controller 18 sends (at block 96) a channel end and device end status to the host 16. The host channel 16 then sends (at block 98) a status accepted to the storage controller 18, which ends the I/O operation. In this way, the transfer length factor is used to indicate the number of tracks from which user data is transferred by the last Read Track Data.

If, at block 84, a transfer length factor is not indicated, then the storage controller 18 transfers (at block 88) all user data records in the track until the end of track indicator is reached. The I/O operation then completes at blocks 96 and 98.

In this way, the host 16 and storage controller 18 need only transmit a single read type command, and accompanying handshaking messages, to transfer all user data areas in a track as part of a sequential read operation. A single Read Track Data command is needed to transfer all user data for each track involved in the sequential read operation. The number of operations to transfer user data for all tracks involved in a sequential read operation using the Read Track Data command structure of the preferred embodiments is substantially less than the number of operations needed to accomplish a sequential read operation with the current IBM ESA/390 architecture. The current architecture of the IBM ESA/390 requires a separate read command sequence, including the accompanying handshaking commands, to transfer user data from each CKD record in a track. The Read Track Data command of the preferred embodiments, on the other hand, does not require a separate data transfer request to transfer user data areas within a track. Thus, the Read Track Data operation of the preferred embodiments substantially reduces channel 35 traffic during sequential read operations by substantially reducing the number of commands and messages that must be transferred between the host 16 channels 35 and storage controller 18 to perform a sequential read operation.

A series of Read Track Data commands may be transmitted after a Locate Record Extended command which indicates a Read Trackset operation code. If Read Trackset is specified, then a parameter is included with the Locate Record Extended command that includes a bit map including a value for each track within a specified range of tracks. A bit map value of "1" indicates that the track corresponding to the bit map value is subject to the read operation, whereas a value of "0" indicates that the corresponding track is skipped and not subject to the operation. If the Read Track Data commands follow a Locate Record Extended command including a Read Trackset, then the storage controller 18, at block 76, when accessing the next adjacent track, would consider the bit map value in the Locate Record Extended command parameter corresponding to the accessed next adjacent track before proceeding to block 76. If the bit map value is "1," then the storage controller 18 would proceed to block 78 to transfer all user data records in the accessed track. Otherwise, the storage controller 18 would skip the accessed track to the next adjacent track to again consider the bit map value for the accessed track. In this way, the storage controller 18 would only perform the Read Track Data command on tracks having a corresponding bit map value of "1".

With Read Trackset operations, the Locate Record Extended command further includes a count parameter which indicates the number of tracks on which the Read Track Data operation will be performed. The number of tracks for which user data is transferred, i.e., the number of tracks having a corresponding bit map value of "1," should equal the count parameter. Thus, with the Locate Record Extended command, the step at block 66 comprises the storage controller 18 determining whether the tracks processed so far are equal to the count parameter indicating the number of tracks having a bit map value of "1" minus one.

In preferred embodiments, a series of Read Track Data commands may follow either a Locate Record Extended or Locate Record command that includes the Read Track operation code, which in the current system is used to specify the Read Track operation which dumps all CKD records in a track, including the count and key data of the CKD records. In this way, current parameters and settings may be used and current error checking operations along with the Read Track Data command of the preferred embodiments. Additional current settings and error checking operations are described in the "IBM 3990 Storage Control Reference (Models 1, 2, and 3)," which publication was incorporated by reference above.

Preferred embodiments further include a Write Track Data command which allows a host 16 to transfer all the user data areas on a track to the storage controller 18 to update the data areas of the track. In preferred embodiments, one or more Write Track Data commands follow a Locate Record Extended (LRE) command when the extended operation byte of the LRE command includes an Update Write Trackset Operation code. This operation code prepares the storage controller 18 to update multiple user data areas on one or more tracks specified in the Extended Parameter, which includes a bit map of tracks on which data is updated. This bit map represents a set of sequentially addressed tracks within the domain defined in the Define Extent command preceding the LRE command. If the Write Track Data command is not preceded by a Locate Record Extended command, then the operation is terminated with unit check status indicating an invalid command sequence. As discussed, operations are performed on those tracks having a corresponding bit map value of "1." In preferred embodiments, the first bit in the bit map is "1," and represents the track whose address is specified in the seek address parameter used to initially orient the storage controller 18. If the first bit map value is not one, then the Locate Record Extended command is terminated with unit check status indicating an invalid parameter. The Locate Record Extended command further includes a count parameter indicating the number of tracks in the domain to operate upon, which is equal to the number of bit map values of one.

Figure 4A:
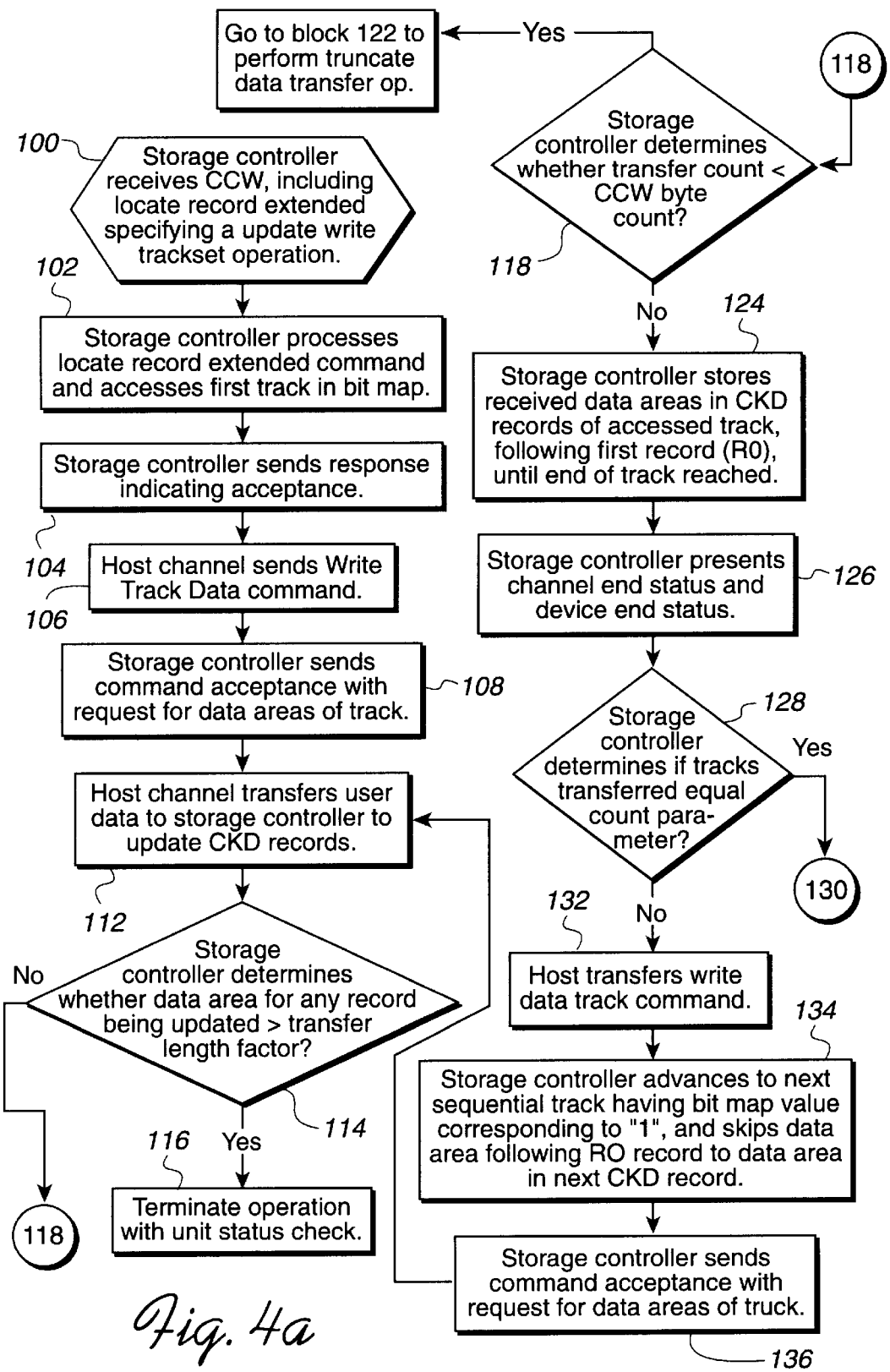
FIGS. 4a, b illustrate logic to execute a write operation in accordance with preferred embodiments of the present invention.
Figure 4B:
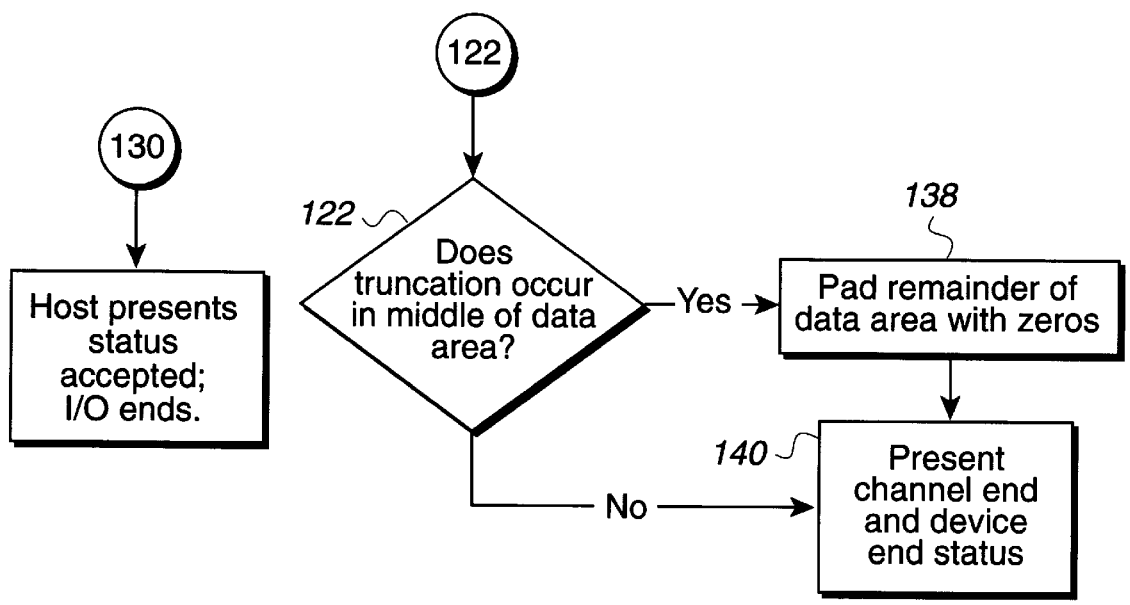

FIGS. 4a, b illustrate logic implemented within the storage controller 18 and host 16 to execute a CCW chain including one or more Write Track Data commands to write the data records to multiple tracks of data. In preferred embodiments, the number of Write Track Data commands in the command sequence following the Locate Record Extended command equals the value of the count parameter. In this way, there is a Write Track Data command for each track specified in the bit map. Otherwise, if the count parameter is not equal to the number of bit map values of one, then the storage controller 18 terminates the operation with a unit check status indicating an invalid command sequence. At block 100, the storage controller 18 receives a CCW, including the Define Extent and Locate Record Extended commands. The Locate Record Extended command specifies an update write trackset operation and includes an extended parameter of a bit map of tracks in a range within the domain extent of tracks on which to perform the Write Track Data operations. The storage controller 18 processes (at block 102) the Locate Record Extended (LRE) command parameters to accesses the first track indicated in the bit map, which is the track specified in the Seek Address parameter of the LRE command. The Locate Record Extended parameters may also indicate any record in the first track as the starting record at which the write operation begins. If the track specified in the Seek Address parameter is marked as defective, then the command sequence is terminated with unit check status indicating an invalid track pointer. If the storage controller 18 does not locate a data area after the first record $R_0$ in the track to update, then the storage controller 18 terminates the operation with unit check status of no record found. The storage controller 18 then sends a response (at block 104) indicating acceptance of the command. In response, the host 16 channel 35 sends (at block 106) the Write Track Data command. The storage controller 18 then sends (at block 108) a command acceptance with a request for the data areas of the track. The host channel 35 transfers (at block 112) user data to the storage controller to update the user data in the CKD records in the first accessed track.

As the storage controller 18 receives user data to update the user data area of a CKD record, the storage controller 18 determines (at block 114) determines whether a data length of the user data to update for a CKD record, as indicated in the Count field of the CKD record to be updated, is greater than a transfer length factor included as a parameter in the Locate Record Extended command. If the length of the user data in the CKD record is greater than the transfer length factor, then the storage controller 18 terminates (at block 116) with a unit status check. Otherwise, the storage controller 18 determines (at block 118) whether a transfer count, indicating a current total number of bytes transferred so far for the CCW, is less than a CCW byte count indicated in the Locate Record Extended command. If not, the storage controller 18 stores (at block 124) the received user data in the user data area of the CKD record. Otherwise, if the transfer count is less than the CCW byte count, the storage controller 18 proceeds to block 122 to truncate data transfer. In preferred embodiments, the storage controller 18 stores the first received data area in the second CKD record following $R_0$, and then stores each following received data area in the data area of the next adjacent CKD record until the track end is reached. After storing the received data on every CKD record on the track, the storage controller 18 returns (at block 126) a channel end and device end status. At the completion of updating the data on the track, the storage controller 18 is oriented to the data area of the last record on the track.

In response to the channel and device end, the storage controller 18 determines (at block 128) whether the tracks transferred so far are equal to a count parameter, indicating the total number of tracks to transfer (which is also equal to the number of bit map values equal to one), which is a parameter of the Locate Record Extended (LRE) command. If so, i.e., all tracks have been transferred, then host 16 presents (at block 130) status accepted, and the I/O operation ends. If all tracks have not been transferred, then the host 16 channel 35 transfers (at block 132) a Write rack Data command to update all the CKD records in the next track. The storage controller 18 then advances (at block 134) to the next sequential track having a corresponding bit map value of 1, and skips to the data area in the CKD record following the first CKD record ($R_0$). If there is no data area on the track following the first CKD record $R_0$, then the storage controller terminates the operation with unit status check of no record found. The storage controller 18 then sends (at block 136) command acceptance to the host 16 with a request for the data areas of the track. Control then proceeds back to block 112 to perform the next data transfer and update operation for the track.

If, at block 118, the storage controller 18 determined that the transfer count is less than the CCW byte count, then the storage controller 18 initiates a truncation operation by determining (at block 122) whether the transfer count exceeded the CCW byte count while the storage controller 18 was writing to a data area within a CKD record. If so, the storage controller pads (at block 138) the remainder of the data area with zeros and then presents (at block 140) channel end and device end status to the host 16. Otherwise, if the CCW byte count was exceeded after the storage controller 18 completed updating the data area of a CKD record, then the storage controller 18 would proceed to block 140 to end the data transfer operation.

With the Write Track Data command, the host 16 may update all user data areas on a track with a single command sequence. Current implementations require a separate write command sequence to update each individual record on a track. Thus, the Write Track Data command substantially reduces the number of transmissions needed between the host 16 and storage controller 18 to update the data areas on one or more tracks and, thus, substantially increases bandwidth. Additional commands and status, not shown, may be provided during the execution of the command sequence described in FIGS. 4a, b. Additional handshaking and status commands that may be utilized are described in the IBM publication "IBM 3990 Storage Control Reference," which publication was incorporated by reference above.

With the data transfer commands of the preferred embodiments, a lengthy sequence of read or write operations may be performed with respect to the data areas of multiple tracks in a CKD format. With the prior art CKD commands, a separate command sequence would need to be used to transfer each user data area from each CKD record on the tracks involved in the sequential data transfer operation. With preferred embodiments, only a single data transfer sequence is used to transfer all the user data areas from the CKD records on a track. The preferred embodiment commands transfer only the data areas from the CKD records, and do not transfer index information, such as the count and key data areas of the CKD records. The preferred embodiment commands, thus, substantially reduce the number of commands and, hence channel traffic, when performing sequential data transfer operations that involve only the user data.

Currently, with sequential data transfer operations, the effective data transfer rate in an IBM 3990 Storage Controller system using ESCON fibre channels is approximately 12–13 Mb/sec. It has been noted that with the new Write Track Data and Read Track Data commands of the preferred embodiments, the effective data transfer rate for sequential operations increases to 15–16 Mb/sec.

Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described as performing read and write operations with respect to CKD records in tracks. The data operations may be performed on copies of the tracks maintained in a storage area, other than the DASD, managed by the storage controller 18, such as a cache or non-volatile memory ("NVS"). If the updated data was written to tracks in a cache or NVS, then the storage controller 18 would later destage the modified data to the DASD.

Preferred embodiments were described with respect to sequential data transfer operations which involve reading or writing numerous, sequentially stored, user data records. However, in alternative embodiments, the preferred embodiment commands may be used in non-sequential or random data transfer operations.

Preferred embodiments provided specific naming conventions for the data transfer operations described herein, such as Write Track Data, Read Track Data, etc. However, any naming scheme or format may be used in implementing the commands which perform the functions described herein.

Preferred embodiments were described with respect to a storage controller, host, and DASD system. In alternative embodiments, the preferred embodiment commands may be used with any type of storage system arrangement, where one processing unit performs data operations with respect to a storage device by communicating with another processing unit that manages and controls access to the storage device. The storage device storing the data may be any storage device known in the art, including volatile and non-volatile storage devices, such as tape drives, flash memory, optical disk drives, etc. For instance, the commands may be used with any processor-to-processor communication, regardless of the environment in which the processors are implemented, i.e., the same computer, a network environment, etc.

Preferred embodiments were described with respect to the CKD record format, where user data is stored in CKD records on a track, such that each CKD record includes a count field and may include an key field. The preferred embodiment commands may apply to other data storage formats in which data is stored in records that include index information, such as the count and/or key type information, along with the user data. Such data formats are distinguished from the SCSI storage format which stores data in fixed blocks without the use of index information with each data record. Preferred embodiments are applicable to data storage formats that provide index fields in each data record along with user data.

In summary, preferred embodiments disclose a method, system, and program for data transfer operations between a first processing unit and second processing unit. The second processing unit controls access to a storage system. The storage system storage space is logically divided into multiple tracks. Each track includes one or more data records. Each data record includes an index area providing index information on the content of the data record and a user data area including user data. An initialization command is communicated from the first processing unit to the second processing unit indicating a range of tracks on which data transfer operations will be performed. For each track in the range of tracks, a set of data transfer operations is executed. This set of data transfer operations includes transmitting a data transfer command from the first processing unit to the second processing unit. The data transfer command causes the second processing unit to perform data transfer operations with respect to user data areas in multiple data records on an accessed track in the range of tracks. The data transferred during the data transfer operation is free of data from the index areas of the data records.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for executing data transfer commands to perform data transfer operations between a first processing unit and second processing unit, wherein the second processing unit controls access to a storage system, wherein the storage system storage space is logically divided into multiple tracks, wherein each track includes one or more data records, wherein each data record includes an index area providing index information on content of the data record and a user data area including user data, comprising the first processing unit transmitting, for each track in the range of tracks, a data transfer command to the second processing unit to perform a data transfer operation between the first and second processing units, wherein the data transfer command causes the second processing unit to perform data transfer operations with respect to user data areas in multiple data records on an accessed track in the range of tracks, and wherein the data transferred during the data transfer operation is free of data from the index areas of the data records.

2. The method of claim 1, further comprising transmitting an initialization command to the second processing unit indicating a range of tracks on which data transfer operations will be performed before transmitting the data transfer commands, wherein the initialization command indicates a set of tracks from the range of tracks on which data transfer operations are to be performed, and wherein the set of data transfer operations are executed for each track in the set of tracks.

3. The method of claim 2, wherein the initialization command further includes a bit map data structure including a value for each track in the range of tracks, wherein the bit map value for the tracks in the set of tracks is set to one.

4. The method of claim 1, wherein the data records on the tracks are in the count-key-data format, and wherein the index area comprises the count and key data of the data record.

5. The method of claim 1, wherein the data transfer operation is a read operation, and wherein the set of data transfer operations performed by the first processing unit further comprises receiving user data the second processing accessed from the storage system, free of data from the index areas.

6. The method of claim 1, wherein the data transfer command is a write command, and wherein the set of data transfer operations further comprises:
   receiving a request for the data from the second processing unit; and
   transmitting the user data to the second processing unit, wherein the second processing unit writes the transmitted user data to the user data area of the data records in the track.

7. A method for executing data transfer commands to perform data transfer operations between a first processing unit and second processing unit, wherein the second processing unit controls access to a storage system, wherein the storage system storage space is logically divided into multiple tracks, wherein each track includes one or more data records, wherein each data record includes an index area providing index information on content of the data record and a user data area including user data, comprising the second processing unit performing:
   receiving an initialization command from the first processing unit indicating a range of tracks for data transfer operations;
   executing, for each track in the range of tracks, a set of data transfer operations comprising:
      (i) receiving a data transfer command from the first processing unit to perform a data transfer operation between the first and second processing units;
      (ii) accessing a track in the range of tracks; and
      (iii) executing the received data transfer command to perform data transfer operations with respect to user data areas in multiple data records on the accessed track in the range of tracks, wherein the data transferred during the data transfer operations is free of data from the index areas of the data records.

8. The method of claim 7, wherein the initialization command further indicates a set of tracks from the range of tracks on which data transfer operations are to be performed, and wherein the set of data transfer operations are executed for each track in the set of tracks.

9. The method of claim 7, wherein the initialization command further includes a bit map data structure including a value for each track in the range of tracks, wherein the bit map value for the tracks in the set of tracks is set to one.

10. The method of claim 7, wherein the data records on the tracks are in the count-key-data format, and wherein the index area comprises the count and key data of the data record.

11. The method of claim 7, wherein the data transfer operation is a read operation, wherein the set of data transfer operations further comprises transmitting, with the second processing unit, to the first processing unit user data free of data from the index areas.

12. The method of claim 7, wherein the data transfer operation is a write operation, and wherein the set of data transfer operations further comprises:
   receiving the user data from the first processing unit; and
   writing the received user data to the user data area of the data records in the track.

13. A system for communicating data transfer commands to a controller to perform data transfer operations therebetween, wherein the controller controls access to a storage system, wherein the storage system storage space is logically divided into multiple tracks, wherein each track includes one or more data records, wherein each data record includes an index area providing index information on content of the data record and a user data area including user data:

a processing unit;

program logic executed by the processing unit, comprising means for transmitting, for each track in the range of tracks, a data transfer command to the second processing unit to perform a data transfer operation between the first and second processing units, wherein the data transfer command causes the second processing unit to perform data transfer operations with respect to user data areas in multiple data records on an accessed track in the range of tracks, and wherein the data transferred during the data transfer operation is free of data from the index areas of the data records.

14. The system of claim 13, wherein the program logic further comprises means for transmitting an initialization command to the second processing unit indicating a range of tracks on which data transfer operations will be performed before transmitting the data transfer commands, wherein the initialization command indicates a set of tracks from the range of tracks on which data transfer operations are to be performed, and wherein the set of data transfer operations are executed for each track in the set of tracks. wherein the initialization command further indicates a set of tracks from the range of tracks on which data transfer operations are to be performed, and wherein the set of data transfer operations are executed for each track in the set of tracks.

15. The system of claim 14, wherein the initialization command further includes a bit map data structure including a value for each track in the range of tracks, wherein the bit map value for the tracks in the set of tracks is set to one.

16. The system of claim 13, wherein the data records on the tracks are in the count-key-data format, wherein the index area comprises the count and key data of the data record, wherein the system comprises a host computer system and the controller comprises a storage controller, and wherein the storage system comprises a direct access storage device (DASD).

17. The system of claim 13, wherein the data transfer operation is a read operation, and wherein the set of data transfer operations performed by the system comprises receiving user data the controller accessed from the storage system, free of data from the index areas.

18. The system of claim 13, wherein the data transfer command is a write command, and wherein the set of data transfer operations further comprises:

means for receiving a request for the data from the controller; and means for transmitting the user data to the controller, wherein the controller writes the transmitted user data to the user data area of the data records in the track.

19. A controller for executing data transfer commands to perform data transfer operations between a computer system and second processing unit, wherein the controller controls access to a storage system, wherein the storage system storage space is logically divided into multiple tracks, wherein each track includes one or more data records, wherein each data record includes an index area providing index information on content of the data record and a user data area including user data, comprising:

a processing unit;

program logic executed by the processing unit, comprising:

(i) means for receiving an initialization command from the computer system indicating a range of tracks for data transfer operations;

(ii) means for executing, for each track in the range of tracks, a set of data transfer operations comprising:

(a) means for receiving a data transfer command from the computer system to perform a data transfer operation between the computer system and the processing unit;

(b) means for accessing a track in the range of tracks; and (c) means for executing the received data transfer command to perform data transfer operations with respect to user data areas in multiple data records on the accessed track in the range of tracks, wherein the data transferred during the data transfer operations is free of data from the index areas of the data records.

20. The system of claim 19, wherein the initialization command further indicates a set of tracks from the range of tracks on which data transfer operations are to be performed, and wherein the set of data transfer operations are executed for each track in the set of tracks.

21. The system of claim 19, wherein the initialization command further includes a bit map data structure including a value for each track in the range of tracks, wherein the bit map value for the tracks in the set of tracks is set to one.

22. The system of claim 19, wherein the data records on the tracks are in the count-key-data format, wherein the index area comprises the count and key data of the data record, and wherein the system comprises a storage controller and the computer system comprises a host computer system, and the storage system comprises a direct access storage device (DASD).

23. The system of claim 19, wherein the data transfer operation is a read operation, wherein the set of data transfer operations further comprises means for transmitting to the first processing unit user data free of data from the index areas.

24. The system of claim 19, wherein the data transfer operation is a write operation, and wherein the set of data transfer operations further comprises:

means for receiving the user data from the computer system; and means for writing the received user data to the user data area of the data records in the track.

25. An article of manufacture including data transfer commands to perform data transfer operations between a first processing unit and second processing unit, wherein the second processing unit controls access to a storage system, wherein the storage system storage space is logically divided into multiple tracks, wherein each track includes one or more data records, wherein each data record includes an index area providing index information on content of the data record and a user data area including user data, the article of manufacture comprising computer readable storage media including at least one computer program embedded therein that is capable of causing the first processing unit to transmit, for each track in the range of tracks, a data transfer command to the second processing unit to perform a data transfer operation between the first and second processing units, wherein the data transfer command causes the second processing unit to perform data transfer operations with respect to user data areas in multiple data records on an accessed track in the range of tracks, and wherein the data transferred during the data transfer operation is free of data from the index areas of the data records.

26. The article of manufacture of claim 25, further capable of causing the first processing unit to transmit an initialization command to the second processing unit indicating a range of tracks on which data transfer operations will be performed before transmitting the data transfer commands, wherein the initialization command indicates a set of tracks from the range of tracks on which data transfer operations are to be performed, and wherein the set of data transfer operations are executed for each track in the set of tracks, wherein the initialization command further indicates a set of tracks from the range of tracks on which data transfer operations are to be performed, and wherein the set of data transfer operations are executed for each track in the set of tracks.

27. The article of manufacture of claim 26, wherein the initialization command further includes a bit map data structure including a value for each track in the range of tracks, wherein the bit map value for the tracks in the set of tracks is set to one.

28. The article of manufacture of claim 25, wherein the data records on the tracks are in the count-key-data format, and wherein the index area comprises the count and key data of the data record.

29. The article of manufacture of claim 25, wherein the data transfer operation is a read operation, and wherein the set of data transfer operations further causes the first processing unit to perform receiving user data the second processing accessed from the storage system, free of data from the index areas.

30. The article of manufacture of claim 25, wherein the data transfer command is a write command, and wherein the set of data transfer operations further causes the first processing unit to perform:

receiving a request for the data from the second processing unit; and transmitting the user data to the second processing unit, wherein the second processing unit writes the transmitted user data to the user data area of the data records in the track.

31. An article of manufacture including data transfer commands to perform data transfer operations between a first processing unit and second processing unit, wherein the second processing unit controls access to a storage system, wherein the storage system storage space is logically divided into multiple tracks, wherein each track includes one or more data records, wherein each data record includes an index area providing index information on content of the data record and a user data area including user data, the article of manufacture comprising computer readable storage media including at least one computer program embedded therein that is capable of causing the second processing unit to perform:

receiving an initialization command from the first processing unit indicating a range of tracks for data transfer operations;

executing, for each track in the range of tracks, a set of data transfer operations comprising:
(i) receiving a data transfer command from the first processing unit to perform a data transfer operation between the first and second processing units;
(ii) accessing a track in the range of tracks; and
(iii) executing the received data transfer command to perform data transfer operations with respect to user data areas in multiple data records on the accessed track in the range of tracks, wherein the data transferred during the data transfer operations is free of data from the index areas of the data records.

32. The article of manufacture of claim 31, wherein the initialization command further indicates a set of tracks from the range of tracks on which data transfer operations are to be performed, and wherein the set of data transfer operations are executed for each track in the set of tracks.

33. The article of manufacture of claim 31, wherein the initialization command further includes a bit map data structure including a value for each track in the range of tracks, wherein the bit map value for the tracks in the set of tracks is set to one.

34. The article of manufacture of claim 31, wherein the data records on the tracks are in the count-key-data format, and wherein the index area comprises the count and key data of the data record.

35. The article of manufacture of claim 31, wherein the data transfer operation is a read operation, wherein the set of data transfer operations further causes the second processing unit to perform transmitting to the first processing unit user data free of data from the index areas.

36. The article of manufacture of claim 31, wherein the data transfer operation is a write operation, and wherein the set of data transfer operations further causes the second processing unit to perform:

receiving the user data from the first processing unit; and writing the received user data to the user data area of the data records in the track.

37. A computer readable memory device accessible to a processing unit, wherein the memory device includes comprises a data transfer command to perform data transfer operations between a first processing unit and second processing unit, wherein the second processing unit controls access to a storage system, wherein the storage system storage space is logically divided into multiple tracks, wherein each track includes one or more data records, wherein each data record includes an index area providing index information on the content of the data record and a user data area including user data, wherein the data transfer command is capable of causing the second processing unit to perform data transfer operations with respect to user data areas in multiple data records on an accessed track in the range of tracks, and wherein the data transferred during the data transfer operation is free of data from the index areas of the data records.

38. The memory device of claim 37, wherein the data records on the tracks are in the count-key-data format, and wherein the index area comprises the count and key data of the data record.

39. The memory device of claim 37, wherein the data transfer command is a read command that is further capable of causing the second processing unit to transfer user data accessed from the storage system, free of data from the index areas.

40. The memory device of claim 37, wherein the data transfer command is a write command that is further capable of causing the second processing unit to write the transmitted user data to the user data area of the data records in the track.

* * * * *